(12) United States Patent
Cao

(10) Patent No.: US 11,947,790 B2
(45) Date of Patent: Apr. 2, 2024

(54) INTERFACE DISPLAY METHOD AND TERMINAL, AND COMPUTER READABLE STORAGE MEDIUM

(71) Applicant: VIVO MOBILE COMMUNICATION CO., LTD., Guangdong (CN)

(72) Inventor: Yanjie Cao, Guangdong (CN)

(73) Assignee: Vivo Mobile Communication Co., Ltd., Guangdong (CN)

( * ) Notice: Subject to any disclaimer, the term of this patent is extended or adjusted under 35 U.S.C. 154(b) by 90 days.

(21) Appl. No.: 17/671,900

(22) Filed: Feb. 15, 2022

(65) Prior Publication Data

US 2022/0171513 A1 Jun. 2, 2022

Related U.S. Application Data

(63) Continuation of application No. PCT/CN2020/107424, filed on Aug. 6, 2020.

(30) Foreign Application Priority Data

Aug. 16, 2019 (CN) .......................... 201910757131.7

(51) Int. Cl.
*G06F 3/0488* (2022.01)
*G06F 3/04817* (2022.01)

(52) U.S. Cl.
CPC ........ *G06F 3/0488* (2013.01); *G06F 3/04817* (2013.01)

(58) Field of Classification Search
CPC .. G06F 3/04817; G06F 1/1677; G06F 1/1641; G06F 3/04842; G06F 3/04883; G06F 3/0488; G06F 1/1652; G06F 3/0482; G06F 1/1618; H04M 1/72403; H04M 1/0214

See application file for complete search history.

(56) References Cited

U.S. PATENT DOCUMENTS

| 2013/0321340 | A1* | 12/2013 | Seo ..................... G06F 3/04842 345/174 |
| 2016/0202884 | A1 | 7/2016 | Ohki et al. |
| 2016/0357368 | A1 | 12/2016 | Federighi et al. |
| 2017/0255374 | A1 | 9/2017 | Yasuda et al. |

FOREIGN PATENT DOCUMENTS

| CN | 104777969 A | 7/2015 |
| CN | 106227520 A | 12/2016 |
| CN | 106339171 A | 1/2017 |
| CN | 106933468 A | 7/2017 |
| CN | 107908333 A | 4/2018 |
| CN | 108984067 A | 12/2018 |
| CN | 109062479 A | 12/2018 |

(Continued)

*Primary Examiner* — Yaron Cohen
(74) *Attorney, Agent, or Firm* — Price Heneveld LLP

(57) ABSTRACT

An interface display method and a terminal are provided. The interface display method is applied to the terminal and includes: receiving a first input performed by a user on a target control in a case of displaying a user interface of a first application in a first region of a screen of the terminal, and the target control being used to indicate the first application and/or a second application; and responding to the first input and displaying a user interface of the second application in the first region.

8 Claims, 8 Drawing Sheets

(56) References Cited

FOREIGN PATENT DOCUMENTS

| | | | |
|---|---|---|---|
| CN | 109814795 | A | 5/2019 |
| CN | 110536007 | A | 12/2019 |
| EP | 3200145 | A1 | 8/2017 |
| JP | 10293677 | A | 11/1998 |
| JP | 2014511524 | A | 5/2014 |
| JP | 2015021732 | A | 2/2015 |
| JP | 2015041271 | A | 3/2015 |
| JP | 2017528776 | A | 9/2017 |
| WO | 2016042864 | A1 | 3/2016 |
| WO | 2016200586 | A1 | 12/2016 |

* cited by examiner

INTERFACE DISPLAY METHOD AND TERMINAL, AND COMPUTER READABLE STORAGE MEDIUM

CROSS-REFERENCE TO RELATED APPLICATION

This application is a continuation application of PCT International Application No. PCT/CN2020/107424 filed on Aug. 6, 2020, which claims priority to Chinese Patent Application No. 201910757131.7, filed on Aug. 16, 2019 in China, the disclosures of which are incorporated herein by reference in their entireties.

TECHNICAL FIELD

The embodiments of the present disclosure relate to the field of communication technologies, and in particular, to an interface display method and a terminal.

BACKGROUND

With the development of mobile phone software and hardware, more and more applications (APP) are installed on each mobile phone. In the process of using the mobile phone, you usually open a plurality of APPs, but only one APP interface can be displayed at a time. To switch between APPs, you need to enter the background and select the APP running in the background; or go back to the desktop, slide to an interface where the APP is located, and click the APP icon to open the APP.

In related technologies, APP switching is performed through a plurality of steps by using a mobile phone background, a system desktop, and the like, which requires a plurality of clicks, slides, and other operations, the operations are cumbersome, and the APP cannot be switched quickly.

SUMMARY

According to a first aspect, some embodiments of the present disclosure provide an interface display method, applied to a terminal and including:
  receiving a first input performed by a user on a target control in a case of displaying a user interface of a first application in a first region of a screen of the terminal, and the target control being used to indicate the first application and/or a second application; and
  responding to the first input and displaying a user interface of the second application in the first region.

According to a second aspect, some embodiments of the present disclosure further provide a terminal, including:
  a first receiving module, configured to receive a first input performed by a user on a target control in a case of displaying a user interface of a first application in a first region of a screen of the terminal, and the target control being used to indicate the first application and/or a second application; and
  a first display module, configured to respond to the first input and display a user interface of the second application in the first region.

According to a third aspect, some embodiments of the present disclosure further provide a terminal, including: a memory, a processor, and a program stored in the memory and executable on the processor, where the program, when executed by the processor, implements steps of the foregoing interface display method.

According to a fourth aspect, some embodiments of the present disclosure further provide a computer-readable storage medium, where the computer-readable storage medium stores a computer program, and when the computer program is executed by a processor, steps of the foregoing interface display method are implemented.

DETAILED DESCRIPTION OF THE EMBODIMENTS

The technical solutions in the embodiments of the present disclosure are described below clearly with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure shall fall within the protection scope of the present disclosure.

Figure 1:
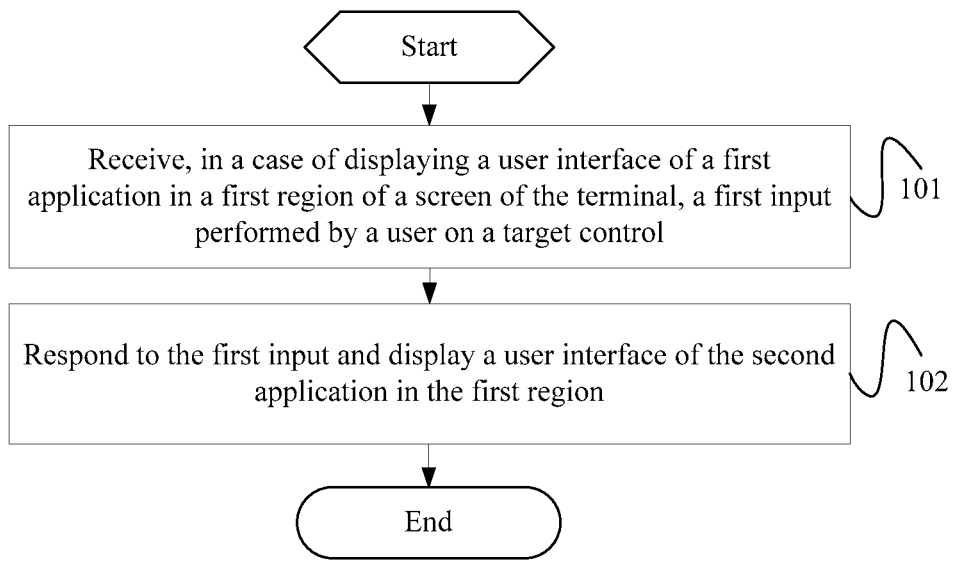
FIG. 1 is a schematic flowchart of an interface display method according to some embodiments of the present disclosure.

As shown in FIG. 1, some embodiments of the present disclosure provide an interface display method applied to a terminal and including:

Step 101: Receiving a first input performed by a user on a target control in a case of displaying a user interface of a first application in a first region of a screen of the terminal.

The target control is used to indicate the first application and/or the second application; the first input may be a click input, a long press input, a slide input, and the like. In other words, the first input is a specific operation performed by the user on the target control on the interface of the terminal, including a click operation, a long press operation, a slide operation, a zoom operation, and the like.

Step 102: Responding to the first input and displaying a user interface of the second application in the first region.

It should be noted that the application mentioned in some embodiments of the present disclosure refers to applications that have been opened on different regions of a screen of a terminal, and the region may be in a screen-off state or a screen-on state. In some embodiments of the present disclosure, the second application is already in an open state before being displayed in the first region, and the user interface of the second application has been displayed in other regions other than the first region.

It should be noted that the terminal includes a first region and a second region, and before the terminal receives the first input performed by the user on the target control, the user interface of the first application is displayed on the first region, and the user interface of the second application is displayed on the second region; specifically, after receiving the first input performed by the user on the target control, the terminal responds to the first input, and after displaying the user interface of the second application in the first region, the terminal further displays the user interface of the first application in the second region. In other words, the user interface of the application displayed in the first region and the user interface of the application displayed in the second region are exchanged in this case; it should be noted that in this case, the target control is displayed on the first region or the second region, and after the user performs a specific operation on the target control, the applications on the two regions may be exchanged quickly without performing a cross-screen drag operation on the application by the user.

It should also be noted that the terminal includes at least two regions, and before the terminal receives the first input performed by the user on the target control, the method further includes: receiving a third input performed by the user; obtaining a quantity N of regions in which the user interface of the application is displayed; and responding to the third input, displaying the target control, the target control including N sub-controls, and each sub-control indicating an application displayed on one region, where N is an integer greater than 1.

It should be noted that in this case, before the first input is performed on the target control, the target control needs to be displayed. The target control is displayed based on the quantity of regions where the user interface of the opened application is displayed. In other words, the quantity of regions where the application is displayed is equal to the quantity of sub-controls included in the displayed target control. In this way, it is convenient to control the application.

It should be noted that the target control includes at least two sub-controls, and each sub-control indicates one application. For example, each sub-control is represented by a circle.

The specific implementation premises of some embodiments of the present disclosure are described in detail as follows.

Figure 2:
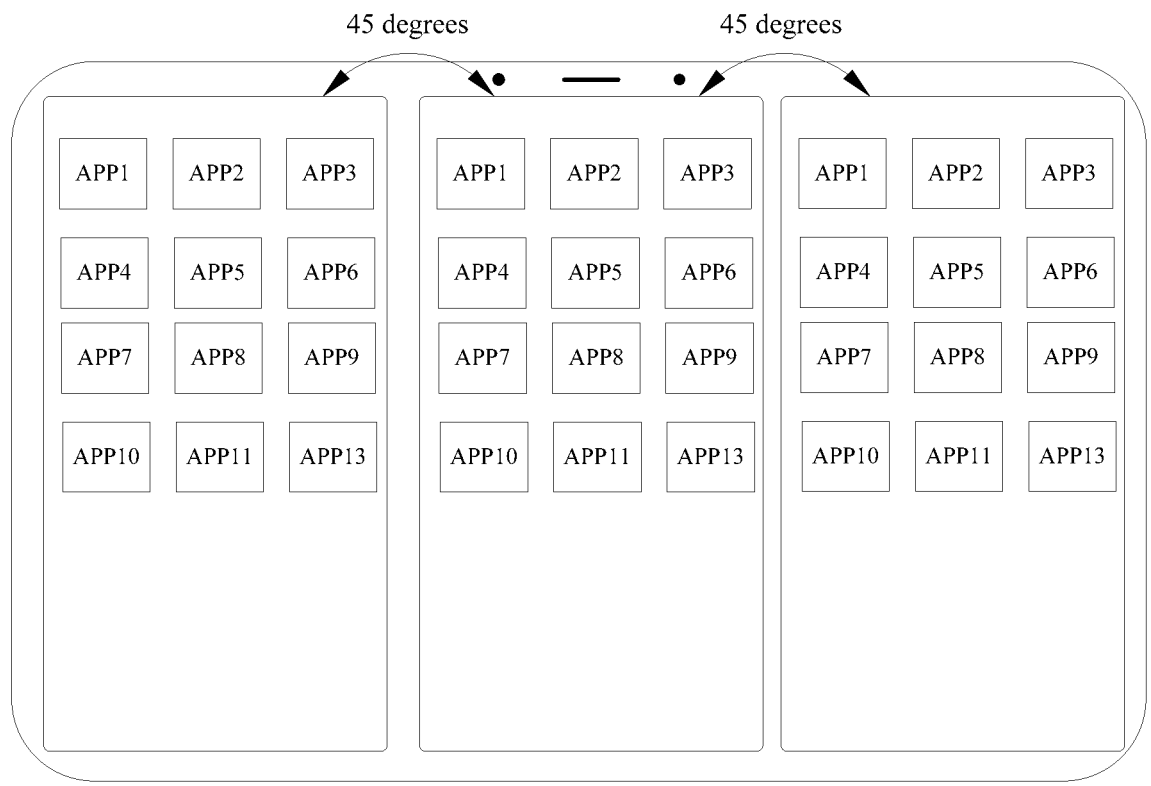
FIG. 2 is a schematic diagram of an interface state of a flexible display screen.

For example, on a mobile phone with a flexible display screen, each display part (namely, region) of the flexible display screen may be folded to be in a specific angle. The flexible display screen of the mobile phone is divided into three display parts, and a left one third display part of the mobile phone is folded to be at a 45-degree angle with a middle display part of the mobile phone. This display part is a first display screen (also referred to as a first display region); similarly, a right one third display part of the mobile phone is folded to be at a 45-degree angle with the middle display part of the mobile phone. This display part is a second display screen (also referred to as a second display region). Through the foregoing operations, the entire mobile phone is divided into three display parts at this time, and the middle display part is a third display screen (also referred to as a third display region). These three display parts are independent, which is equivalent to a mobile phone with three display screens. The details are shown in FIG. 2.

Figure 3:
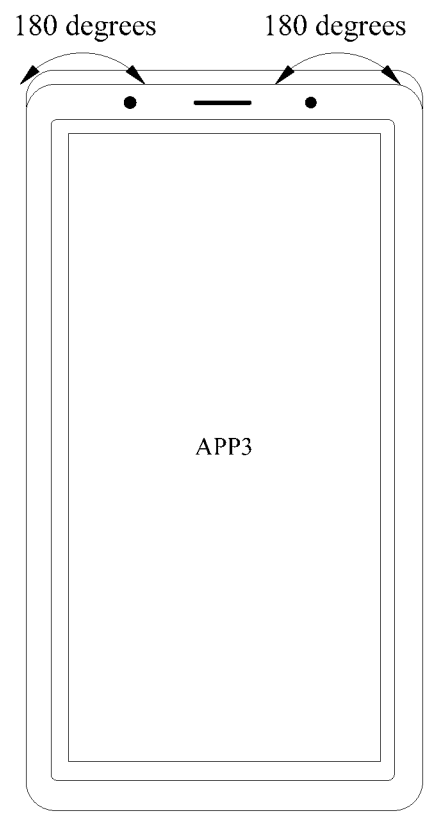
FIG. 3 is a schematic diagram of a bending state of a flexible display screen.

First, the user opens a to-be-used APP1 on the first display screen on the far left, and at this time, a user interface of the APP1 is displayed on the first display screen, then the left screen is folded back to be at a 180-degree angle with the middle screen of the mobile phone, and at this time, the left screen of the mobile phone is in a screen-off state; then the user opens a second to-be-used APP2 on the second display screen on the far right, and at this time, a user interface of the APP2 is displayed on the second display screen, similarly, the right screen is folded back to be at a 180-degree angle with the middle screen of the mobile phone, and at this time, the right screen of the mobile phone is also in a screen-off state; finally an APP3 is opened on the third display screen in the middle of the mobile phone, and at this time, a user interface of the APP3 is displayed on the third display screen, which is also the display screen being operated by the user. Then the user may use the APP3 normally on the third display screen in the middle of the mobile phone. The details are shown in FIG. 3.

In order to exchange the display regions of the applications, the target control needs to be displayed on the screen of the terminal first. Specifically, a slide input may be performed on the terminal, and the terminal displays the target control in response to the slide input.

Optionally, the slide input is a slide operation performed on a connection region of two display screens of the flexible display screen of the terminal, and in response to the slide input, the terminal displays the target control (namely, an application switching icon). Specifically, the target control includes: at least two sub-controls, each sub-control is corresponding to an opened application of the flexible display screen, and each sub-control displays identification information of an opened application.

Specifically, the at least two sub-controls of the target control are in an overlapping state, for example, each sub-control is a circle, and the target control is a concentric circle including circles with different acreages.

Figure 4:
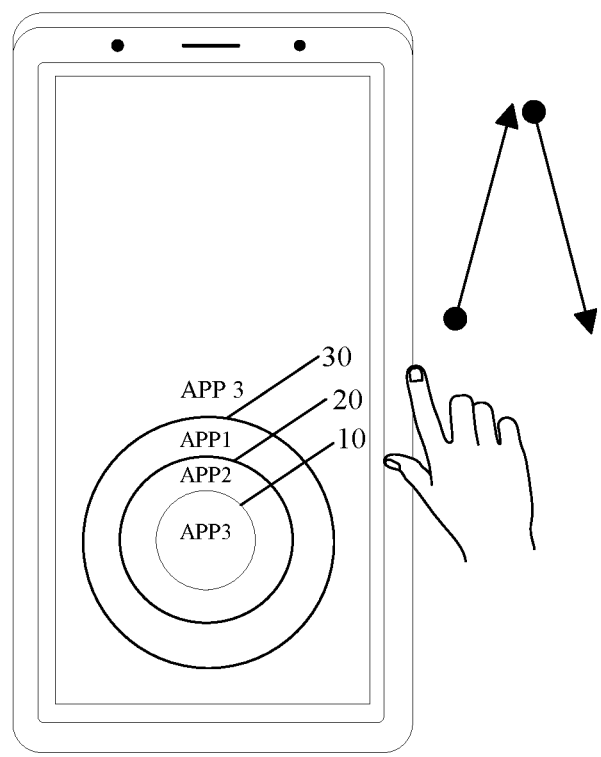
FIG. 4 is a schematic diagram of a user operation state of calling up an application switching icon.

For example, in a process of using the third display screen, if the user wants to switch to the APP set on the first display screen or the second display screen, he needs to call up a target control (namely, the application switching icon) for operation. A specific operation mode of calling up the target control is: sliding a finger upwards for a short distance at a folding position between the third display screen and the second display screen, and then sliding down for a specific distance to call up the target control, that is, the terminal enters an application switching mode, and the details are shown in FIG. 4; specifically, three concentric circles are displayed on a lower half of the third display screen: a target control (for example, a dial-shaped control in FIG. 4) including a first circle 10, a second circle 20, and a third circle 30, and the target control is displayed above an APP interface; the APP1 opened on the first display screen is displayed on a first layer of ring of the target control (a ring formed by the third circle 30 and the second circle 20); the APP2 set on the second display screen is displayed on a second layer of ring of the target control (a ring formed by the first circle 10 and the second circle 20); and the opened APP3 is displayed on the first circle 10 (namely, the center circle).

Some embodiments of the present disclosure are described in detail as follows.

Optionally, a specific implementation of step 101 is: receiving a first input performed by the user on a first sub-control in the target control; and further, an implementation of step 102 is: responding to the first input and displaying the user interface of the second application indicated by a second sub-control in the first region, where the second sub-control is determined by the first input.

A further implementation of step 102 is specifically described from different perspectives as follows.

Method 1: Exchange the display regions of the applications by updating acreages of the sub-controls Specifically, in this case, a further implementation of step 102 is as follows: responding to the first input, and adjusting the first sub-control from a first acreage to a second acreage;
  obtaining the second sub-control whose control acreage is the second acreage; and
  displaying the user interface of the second application indicated by the second sub-control in the first region.

It should be noted that in this case, the display regions of the applications are exchanged by adjusting the acreages of the sub-controls. In other words, after displaying the user interface of the second application indicated by the second sub-control in the first region, the terminal may adjust the second sub-control from the second acreage to the first acreage, that is, during the adjustment, an acreage of one sub-control is adjusted to be the same as an acreage of another sub-control. At this time, the acreage of the another sub-control may be automatically adjusted to the acreage of the sub-control for acreage adjustment.

Method 2: Exchange the display regions of the applications by adjusting an acreage of an auxiliary control with the help of the auxiliary control Specifically, in this case, a further implementation of step 102 is as follows:
  responding to the first input, displaying an alternate control having a same initial control acreage with the first sub-control, and adjusting an acreage of the alternate control to the second acreage;
  obtaining the second sub-control whose control acreage is the second acreage; and
  displaying the user interface of the second application indicated by the second sub-control in the first region.

For example, the alternate control is a blurred graphic, that is, after the user performs the first input, the blurred graphic is displayed on the target control, and an acreage of the blurred graphic may further be adjusted.

Figure 5:
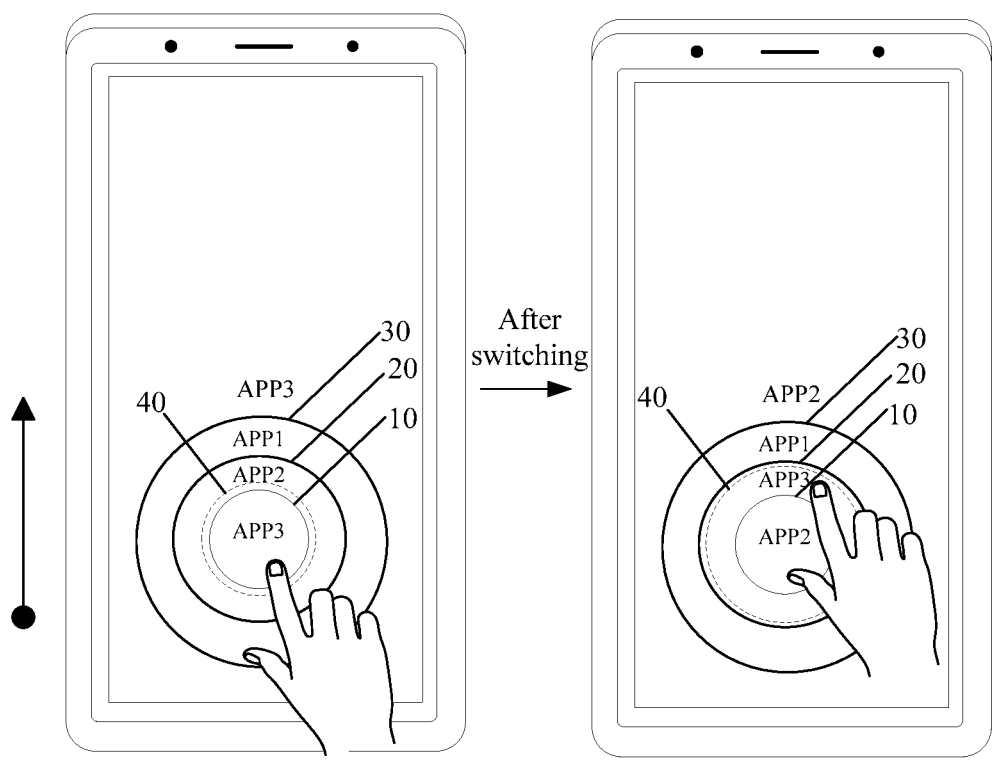
FIG. 5 is a first schematic diagram of a user operation state of switching applications.

For example, if the user presses a center circle with hand, a blurred circle 40 (namely, the foregoing alternate control) appears at the position of the circle. As the user slides the finger, when the finger slides upwards, the blurred circle 40 gradually increases. When the blurred circle 40 is the same size as the second layer of ring (the ring formed by the first circle 10 and the second circle 20), stop sliding and take the finger away from the screen, and the APP3 displayed on the circle and the APP2 displayed on the second layer of ring are exchanged. As what is displayed on the ring changes, the APP on the second display screen and the APP on the third display screen are also exchanged, that is, the APP2 is displayed on the third display screen, and the APP3 is displayed on the second display screen. At this time, although still in the screen-off state, the second display screen saves the current state of the APP3. The details are shown in FIG. 5.

Similarly, when the blurred circle is the same size as the first layer of ring (the ring formed by the third circle 30 and the second circle 20), stop sliding and take the finger away from the screen, and the APP3 displayed on the center circle and the APP1 displayed on the first layer of ring are exchanged. As what is displayed on the ring changes, the APP on the first display screen and the APP on the third display screen are also exchanged, that is, the APP1 is displayed on the third display screen, and the APP3 is displayed on the first display screen. At this time, although still in the screen-off state, the first display screen saves the current state of the APP3.

For example, if the user presses the first layer of ring with hand, a blurred circle appears at the position of the first layer of ring. As the user slides the finger, when the finger slides downwards, the blurred circle gradually decreases. When the blurred circle is the same size as the second layer of ring, stop sliding and take the finger away from the screen, and the APP1 displayed on the first layer of ring and the APP2 displayed on the second layer of ring are exchanged. As what is displayed on the ring changes, the APP on the first display screen and the APP on the second display screen are also exchanged, that is, the APP2 is displayed on the first display screen, and the APP1 is displayed on the second display screen. At this time, although still in the screen-off state, the first display screen and the second display screen save the current states of the APP1 and the APP2.

Similarly, when the blurred first layer of ring is the same size as the center circle, stop sliding and take the finger away from the screen, and the APP3 displayed on the center circle and the APP1 displayed on the first layer of ring are exchanged. As what is displayed on the ring changes, the APP on the first display screen and the APP on the third display screen are also exchanged, that is, the APP1 is displayed on the third display screen, and the APP3 is displayed on the first display screen. At this time, although still in the screen-off state, the first display screen saves the current state of the APP3.

It should be noted that an operation of dragging the second layer of ring is the same as dragging the first layer of ring. Details are not described herein again.

Optionally, another specific implementation of step 101 is: receiving a slide input performed by the user on a third sub-control; and further, an implementation of step 102 is: determining a fourth sub-control according to a slide direction of the slide input; and responding to the slide input and displaying the user interface of the second application indicated by the fourth sub-control in the first region.

It should be noted that, because the target control includes a plurality of sub-controls in an overlapping state, the plurality of sub-controls need to be separated first, that is, before step 101, the method further includes: receiving a second input performed by the user on the third sub-control in the target control; and responding to the second input, and adjusting each sub-control in the target control to be in a non-overlapping state.

Further, a manner of determining a fourth sub-control according to the slide direction is: determining a moving direction of the third sub-control; and obtaining the fourth sub-control in the moving direction.

In this implementation, after the target control including a plurality of sub-controls in the overlapping state is displayed, the plurality of sub-controls need to be separated first, that is, the plurality of sub-controls are adjusted to be in the non-overlapping state, and then one of the sub-controls is operated. According to this operation, a display region of an application corresponding to a sub-control exchanged with the application corresponding to the sub-control is determined, and then the display regions of the applications are exchanged. In this way, display region exchange of the applications may be more convenient.

Figure 6:
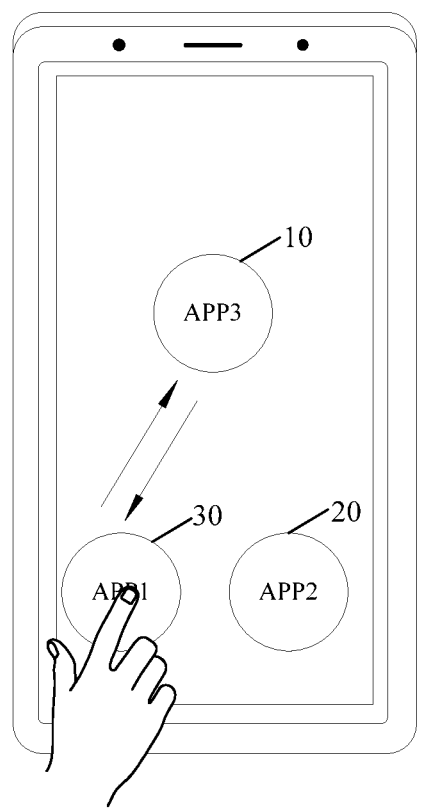
FIG. 6 is a second schematic diagram of a user operation state of switching applications.

For example, if the user presses the center circle and slides the finger to the top of the screen, the center circle may follow the finger to slide to the top of the screen. At the same time, the first layer of ring may automatically move to the bottom left of the screen, and the second layer of ring may automatically move to the bottom right of the screen. The three concentric circles are scattered into three circles, as shown in FIG. 6, and FIG. 6 shows the first circle 10, the second circle 20, and the third circle 30; the circle representing the APP displayed on the third display screen is at the top of the screen, the circle corresponding to the first display screen is displayed on the bottom left, and the circle corresponding to the second display screen is displayed on the bottom right; if pressing the circle corresponding to the first display screen and sliding quickly to the top of the screen in the direction of the arrow in FIG. 6, the circle corresponding to the first display screen may move to the top of the screen corresponding to the position of the circle displaying the APP3 on the third display screen, and the circle corresponding to the third display screen on the top of the screen may move to the position of the circle corresponding to the first display screen at the bottom left of the screen. After the positions of the two circles are exchanged, the APP1 on the first display screen may be displayed on the third display screen, and the state of the APP3 may be saved on the first display screen. It should be noted that the same is true for the exchange of the second display screen and the third display screen.

Figure 7:
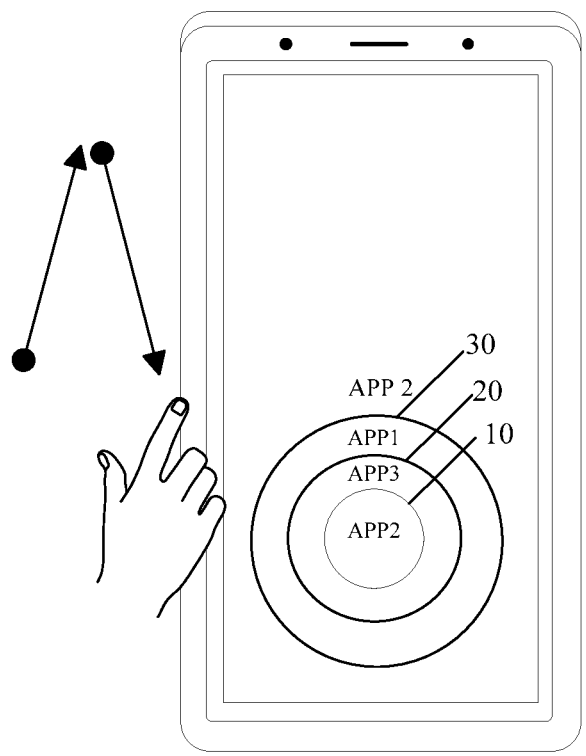
FIG. 7 is a schematic diagram of a user operation state of canceling an application switching icon.

It should be noted that after performing the application switching operation, the user only needs to perform a slide operation on a connection region of the two display parts to exit the application switching mode. For example, after the user switches the APP, or when the user wants to cancel the target control, the target control may be canceled by sliding the finger upwards for a short distance in a folded position between the first display screen and the third display screen, and then sliding downwards for a specific distance. The details are shown in FIG. 7.

It should be noted that the slide operation for calling up the application switching mode or exiting the application switching mode may be performed in a connection region of same display parts, or in a connection region of different display parts. When the terminal is not in the application switching mode, the application switching mode is called up to perform the slide operation, and when the terminal is in the application switching mode, the application switching mode is exited to perform the slide operation.

It should be noted that in some embodiments of the present disclosure, the applications in different display regions of the same terminal may be quickly exchanged, which facilitates user operations.

Figure 8:
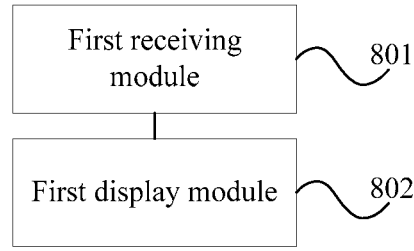
FIG. 8 is a first schematic diagram of a module of a terminal according to some embodiments of the present disclosure.
Figure 9:
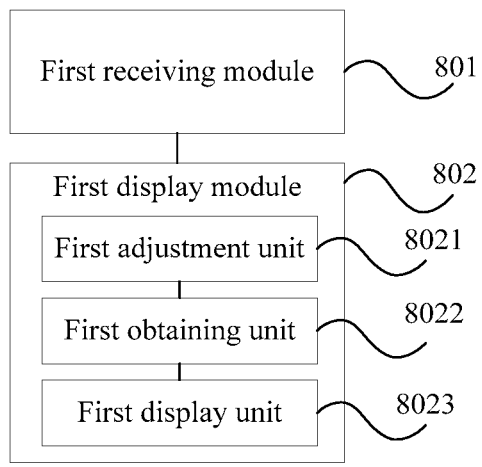
FIG. 9 is a second schematic diagram of a module of a terminal according to some embodiments of the present disclosure.
Figure 10:
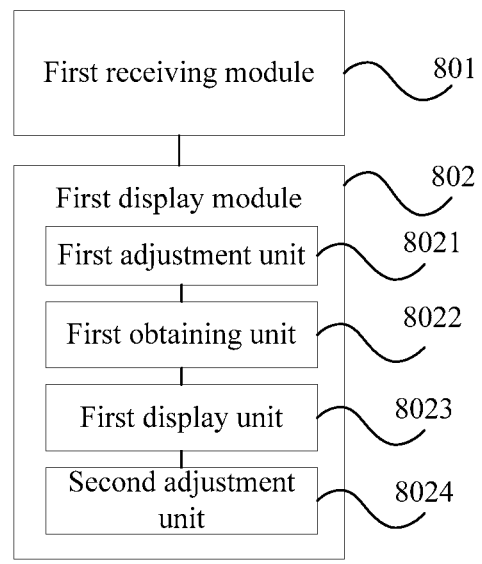
FIG. 10 is a third schematic diagram of a module of a terminal according to some embodiments of the present disclosure.
Figure 11:
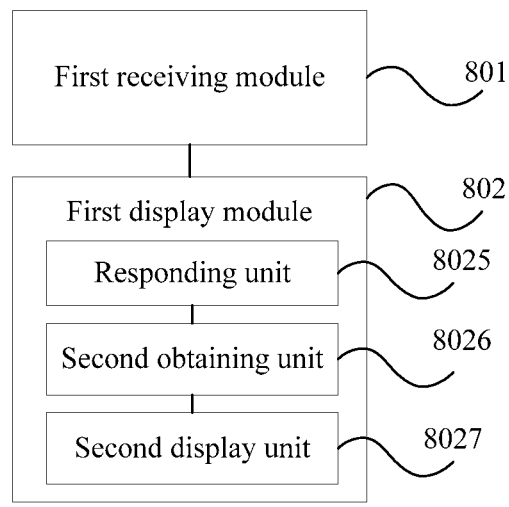
FIG. 11 is a fourth schematic diagram of a module of a terminal according to some embodiments of the present disclosure.
Figure 12:
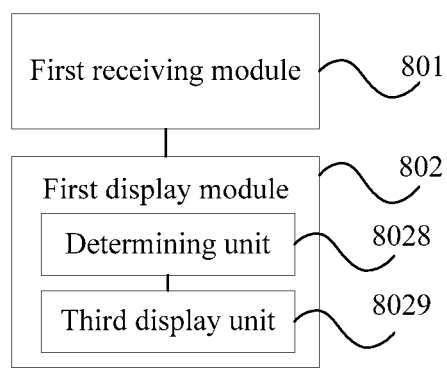
FIG. 12 is a fifth schematic diagram of a module of a terminal according to some embodiments of the present disclosure.
Figure 13:
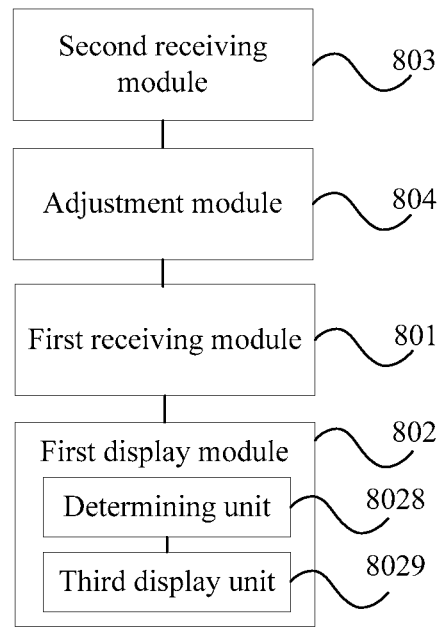
FIG. 13 is a sixth schematic diagram of a module of a terminal according to some embodiments of the present disclosure.
Figure 14:
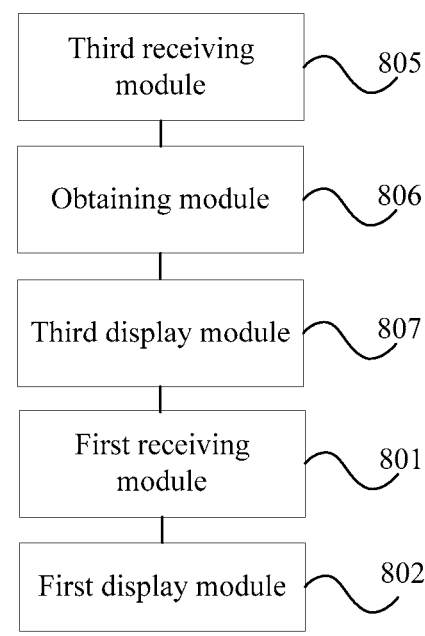
FIG. 14 is a seventh schematic diagram of a module of a terminal according to some embodiments of the present disclosure.

As shown in FIG. 8 and FIG. 14, some embodiments of the present disclosure further provide a terminal, including:
a first receiving module 801, configured to receive a first input performed by a user on a target control in a case of displaying a user interface of a first application in a first region of a screen of the terminal, and the target control being used to indicate the first application and/or a second application; and
a first display module 802, configured to respond to the first input and display a user interface of the second application in the first region.

Specifically, the target control includes: at least two sub-controls, and each sub-control indicates one application.

Optionally, the at least two sub-controls are in an overlapping state.

Optionally, the first receiving module 801 is configured to:
receive a first input performed by the user on a first sub-control in the target control; and
the first display module 802 is configured to:
respond to the first input and display the user interface of the second application indicated by a second sub-control in the first region, where
the second sub-control is determined by the first input.

Further, the first display module 802 includes:
a first adjustment unit 8021, configured to respond to the first input, and adjust the first sub-control from a first acreage to a second acreage;
a first obtaining unit 8022, configured to obtain the second sub-control whose control acreage is the second acreage; and
a first display unit 8023, configured to display the user interface of the second application indicated by the second sub-control in the first region.

Optionally, after the first display unit 8023 displays the user interface of the second application indicated by the second sub-control in the first region, the first display module further includes:
a second adjustment unit 8024, configured to adjust the second sub-control from the second acreage to the first acreage.

Optionally, the first display module 802 includes:
a responding unit 8025, configured to respond to the first input, display an alternate control having a same initial control acreage with the first sub-control, and adjust an acreage of the alternate control to the second acreage;
a second obtaining unit 8026, configured to obtain the second sub-control whose control acreage is the second acreage; and
a second display unit 8027, configured to display the user interface of the second application indicated by the second sub-control in the first region.

Optionally, the first receiving module 801 is configured to:
receive a slide input performed by the user on a third sub-control; and
the first display module 802 includes:
a determining unit 8028, configured to determine a fourth sub-control according to a slide direction of the slide input; and
a third display unit 8029, configured to respond to the slide input and display the user interface of the second application indicated by the fourth sub-control in the first region.

Optionally, before the first receiving module 801 receives the first input performed by the user on the target control, the terminal further includes:
a second receiving module 803, configured to receive a second input performed by the user on the third sub-control in the target control; and
an adjustment module 804, configured to respond to the second input, and adjust each sub-control in the target control to be in a non-overlapping state.

Specifically, the determining unit 8028 is configured to:
determine a moving direction of the third sub-control according to the slide direction; and
obtain the fourth sub-control in the moving direction.

Optionally, the terminal includes a first region and a second region;

before the first receiving module 801 receives the first input performed by the user on the target control, the user interface of the first application is displayed on the first region, and the user interface of the second application is displayed on the second region; and after the first display module 802 displays the user interface of the second application in the first region, the terminal further includes:

a second display module, configured to display the user interface of the first application in the second region.

Optionally, the terminal includes at least two regions; and
before the first receiving module 801 receives the first input performed by the user on the target control, the terminal further includes:

a third receiving module 805, configured to receive a third input performed by the user;

an obtaining module 806, configured to obtain a quantity N of regions in which the user interface of the application is displayed; and a third display module 807, configured to respond to the third input, display the target control, the target control including N sub-controls, and each sub-control indicating an application displayed on one region, where N is an integer greater than 1.

The terminal provided in some embodiments of the present disclosure can implement the processes performed by the terminal in the method embodiment in FIG. 1. To avoid repetition, details are not described herein again. The terminal in some embodiments of the present disclosure receives the first input performed by the user on the target control in a case of displaying the user interface of the first application in the first region of the screen of the terminal, responds to the first input, and displays the user interface of the second application in the first region. In this way, the display region of the application may be quickly exchanged, and user experience may be improved.

Figure 15:
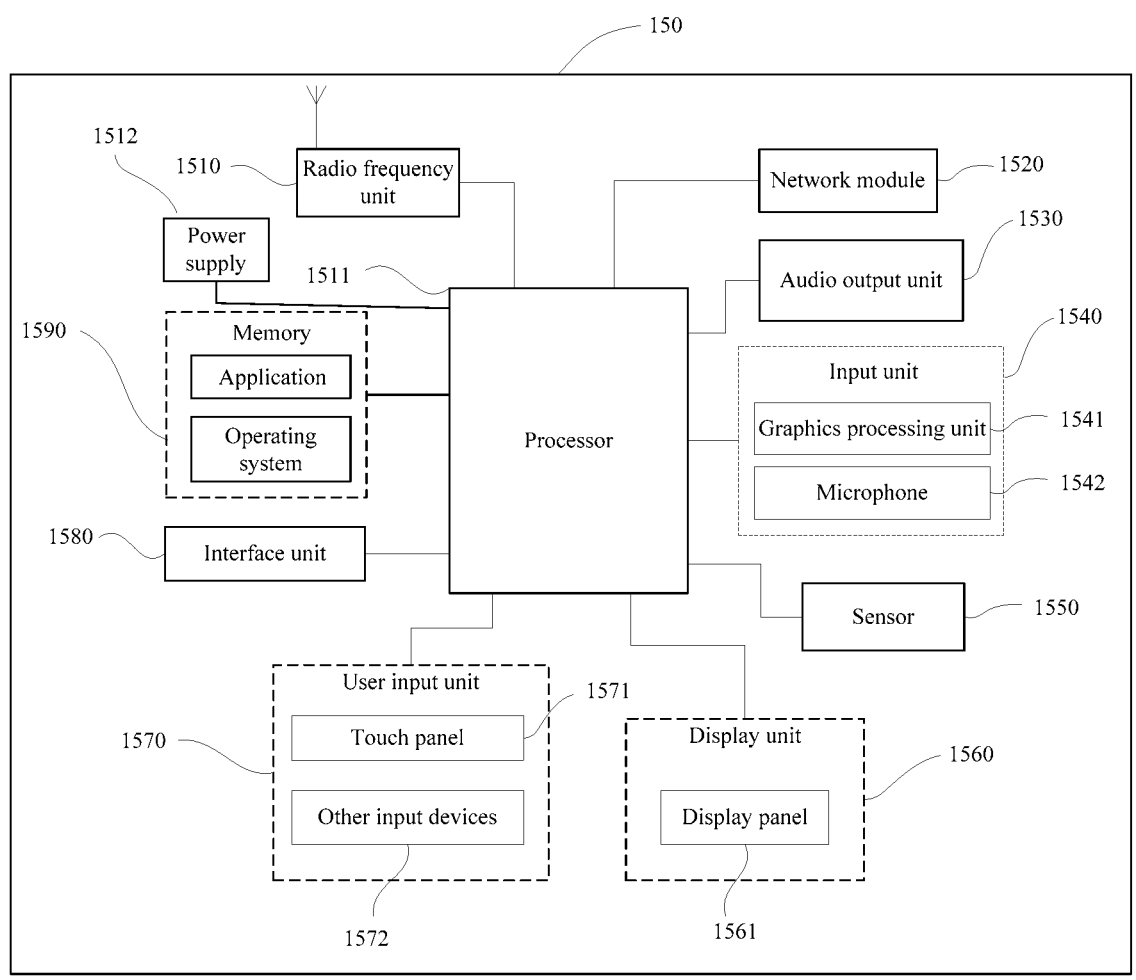
FIG. 15 is a schematic diagram of a hardware structure of a terminal according to some embodiments of the present disclosure.

FIG. 15 is a schematic diagram of a hardware structure of a terminal implementing some embodiments of the present disclosure.

The terminal 150 includes, but is not limited to: a radio frequency unit 1510, a network module 1520, an audio output unit 1530, an input unit 1540, a sensor 1550, a display unit 1560, a user input unit 1570, an interface unit 1580, a memory 1590, a processor 1511, and a power supply 1512. A person skilled in the art may understand that the structure of the user equipment shown in FIG. 15 does not constitute a limitation on the user equipment, and the user equipment may include more or fewer components than those shown in the figure, or combine some components, or have different component arrangements. In some embodiments of the present disclosure, the terminal includes but is not limited to a mobile phone, a tablet computer, a notebook computer, a palmtop computer, an in-vehicle terminal, a wearable device, a pedometer, and the like.

The processor 1511 is configured to receive a first input performed by a user on a target control in a case of displaying a user interface of a first application in a first region of a screen of the terminal, and the target control being used to indicate the first application and/or a second application; and respond to the first input and display a user interface of the second application in the first region.

The terminal in some embodiments of the present disclosure receives the first input performed by the user on the target control in a case of displaying the user interface of the first application in the first region of the screen of the terminal, responds to the first input, and displays the user interface of the second application in the first region. In this way, the display region of the application may be quickly exchanged, and user experience may be improved.

It should be understood that, in some embodiments of the present disclosure, the radio frequency unit 1510 may be configured to receive and send information or receive and send a signal in a call process. Specifically, after receiving downlink data from a base station, the radio frequency unit sends the downlink data to the processor 1511 for processing. In addition, the radio frequency unit sends uplink data to the base station. Usually, the radio frequency unit 1510 includes but is not limited to an antenna, at least one amplifier, a transceiver, a coupler, a low noise amplifier, a duplexer, and the like. In addition, the radio frequency unit 1510 may further communicate with a network and other devices by using a wireless communication system.

The terminal provides a user with wireless broadband Internet access by using the network module 1520, for example, helping the user send and receive emails, browse web pages, and access streaming media.

The audio output unit 1530 may convert audio data received by the radio frequency unit 1510 or the network module 1520 or stored in the memory 1590 into an audio signal, and output the audio signal into a sound. In addition, the audio output unit 1530 may further provide audio output (for example, a call signal receiving sound or a message receiving sound) related to a specific function performed by the terminal 150. The audio output unit 1530 includes a loudspeaker, a buzzer, a receiver, and the like.

The input unit 1540 is configured to receive audio or radio signals. The input unit 1540 may include a graphics processing unit (GPU) 1541 and a microphone 1542, and the graphics processing unit 1541 processes image data of a still picture or video obtained by an image capture apparatus (such as a camera) in a video capture mode or an image capture mode. A processed image frame may be displayed on the display unit 1560. The image frame processed by the graphics processing unit 1541 may be stored in the memory 1590 (or another storage medium) or transmitted via the radio frequency unit 1510 or the network module 1520. The microphone 1542 may receive a sound and may process such a sound into audio data. The processed audio data may be converted, in a phone calling mode, into a format that may be transmitted to a mobile communication base station by using the radio frequency unit 1510 for output.

The user equipment 150 further includes at least one sensor 1550, for example, a light sensor, a motion sensor, and another sensor. Specifically, the light sensor includes an ambient light sensor and a proximity sensor, where the ambient light sensor can adjust brightness of a display panel 1561 based on brightness of ambient light, and the proximity sensor can turn off the display panel 1561 and/or backlight when the user equipment 150 is moved towards the ear. As a type of motion sensor, an accelerometer sensor may detect acceleration values in directions (that are generally three axes), and detect a value and a direction of gravity when the accelerometer sensor is static, and may be configured to: recognize user equipment posture (for example, screen switching between landscape and portrait modes, a related game, or magnetometer posture calibration), and perform a function related to vibration recognition (for example, a pedometer or a knock), and the like. The sensor 1550 may further include a fingerprint sensor, a pressure sensor, an iris sensor, a molecular sensor, a gyroscope, a barometer, a hygrometer, a thermometer, an infrared sensor, and the like. Details are not described herein again.

The display unit 1560 is configured to display information entered by a user or information provided for the user. The display unit 156 may include a display panel 1561, and the display panel 1561 may be configured in a form of liquid crystal display (LCD), organic light-emitting diode (OLED), or the like.

The user input unit 1570 can be configured to receive the inputted digital or character information, and generate key signal input related to user setting and function control of the terminal. Specifically, the user input unit 1570 includes a touch panel 1571 and another input device 1572. The touch panel 1571 is also referred to as a touchscreen, and may collect a touch operation performed by the user on or near the touch panel 1571 (for example, an operation performed on or near the touch panel 1571 by the user by using any appropriate object or accessory such as a finger or a stylus). The touch panel 1571 may include two parts: a touch detection apparatus and a touch controller. The touch detection apparatus detects a touch position of a user, detects a signal brought by a touch operation, and transmits the signal to the touch controller. The touch controller receives touch information from the touch detection apparatus, converts the touch information into contact coordinates, sends the contact coordinates to the processor 1511, and receives and executes a command from the processor 1511. In addition, the touch panel 1571 may be implemented in a plurality of forms, such as a resistive type, a capacitive type, an infrared ray type or a surface acoustic wave type. In addition to the touch panel 1571, the user input unit 157 may further include another input device 1572. Specifically, the another input devices 1572 may include but are not limited to: a physical keyboard, a function key (such as a volume control key, a switch key), a trackball, a mouse, and a joystick. Details are not described herein again.

Further, the touch panel 1571 may cover the display panel 1561. When detecting the touch operation on or near the touch panel 1571, the touch panel 1571 transmits the touch operation to the processor 1511 to determine a type of a touch event, and then the processor 1511 provides corresponding visual output on the display panel 1561 based on the type of the touch event. In FIG. 15, although the touch panel 1571 and the display panel 1561 are used as two independent parts to implement input and output functions of the terminal, in some embodiments, the touch panel 1571 and the display panel 1561 may be integrated to implement the input and output functions of the terminal. This is not specifically limited herein.

The interface unit 1580 is an interface connecting an external apparatus to the terminal 150. For example, the external apparatus may include a wired or wireless headphone port, an external power supply (or a battery charger) port, a wired or wireless data port, a storage card port, a port used to connect to an apparatus having an identity module, an audio input/output (I/O) port, a video I/O port, a headset port, and the like. The interface unit 1580 may be configured to receive an input (such as data information, electrical power) from the external apparatus and transmit the received input to one or more elements within the terminal 150, or the interface unit 1580 may be configured to transmit data between the terminal 150 and the external apparatus.

The memory 1590 may be configured to store a software program as well as every kind of data. The memory 1590 may primarily include a program storage area and a data storage area, where the program storage area may store an operating system, an application (such as a sound playing function, an image playing function) required for at least one function, and the like; and the data storage area may store data (such as audio data, a phone book) created based on the use of a mobile phone. In addition, the memory 1590 may include a high-speed random access memory, and may further include a non-volatile memory such as at least one magnetic disk storage component, a flash memory component, or another volatile solid-state storage component.

The processor 1511 is a control center of the terminal, and connects all parts of the entire terminal by using various interfaces and lines. By running or executing a software program and/or a module stored in the memory 1590 and invoking data stored in the memory 1590, the processor 1511 performs various functions of the terminal and data processing, to perform overall monitoring on the terminal. The processor 1511 may include one or more processing units. Optionally, an application processor and a modem processor may be integrated into the processor 1511. The application processor mainly processes an operating system, a user interface, an application, and the like. The modem processor mainly processes wireless communication. It can be understood that, alternatively, the modem processor may not be integrated into the processor 1511.

The terminal 150 may further include a power supply 1512 (for example, a battery) that supplies power to various components. Optionally, the power supply 1512 may be logically connected to the processor 1511 through a power supply management system, thereby achieving functions of managing charging, discharging, and power consumption through the power supply management system.

In addition, the terminal 150 includes some functional modules not shown. Details are not described herein again.

Optionally, some embodiments of the present disclosure further provide a terminal, including a processor 1511, a memory 1590, and a program that is stored in the memory 1590 and that can run on the processor 1511. When the program is executed by the processor 1511, the processes of the interface display method embodiments are implemented, and a same technical effect can be achieved. To avoid repetition, details are not described herein again.

Some embodiments of the present disclosure further provide a readable storage medium. The readable storage medium stores a program, and the program, when executed by a processor, implements the processes of the interface display method embodiments, and a same technical effect can be achieved. To avoid repetition, details are not described herein again. The readable storage medium is, for example, a read-only memory (Read-Only Memory, ROM for short), a random access memory (Random Access Memory, RAM for short), a magnetic disk, or an optical disc.

It may be understood that the embodiments described in some embodiments of the present disclosure may be implemented by hardware, software, firmware, middleware, microcode, or a combination thereof. For implementation with hardware, a module, a unit, a submodule, a subunit, or the like can be implemented in one or more application specific integrated circuits (ASIC), a digital signal processor (DSP), a digital signal processing device (DSP Device, DSPD), a programmable logic device (PLD), a field-programmable gate array (PFGA), general processors, controllers, micro-controllers, microprocessors, and another electronic unit for implementing the functions of the present application, or their combinations.

It should be noted that in this specification, the terms "comprise", "include" and any other variants thereof are intended to cover non-exclusive inclusion, so that a process, a method, an article, or an apparatus that includes a series of elements not only includes these very elements, but may also include other elements not expressly listed, or further include elements inherent to this process, method, article, or apparatus. An element limited by "includes a . . . " does not, without more constraints, preclude the presence of additional identical elements in the process, method, article, or device that includes the element.

Based on the foregoing descriptions of the embodiments, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of the present disclosure essentially or the part contributing to the prior art may be implemented in a form of a software product. The computer software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of the present disclosure.

The foregoing descriptions are merely optional implementations of the present disclosure. It should be noted that a person of ordinary skill in the art may further make some improvements and refinements without departing from the principles of the present disclosure, and these improvements and refinements also fall within the protection scope of the present disclosure.

The invention claimed is:

1. An interface display method, applied to a terminal and comprising:
   receiving a first input performed by a user on a target control in a case of displaying a user interface of a first application in a first region of a screen of the terminal, and the target control being used to indicate the first application and/or a second application; and
   responding to the first input and displaying a user interface of the second application in the first region,
   wherein the target control comprises: at least two sub-controls, and each sub-control indicates one application, each sub-control indicates a different application,
   wherein the receiving the first input performed by a user on a target control comprises:
   receiving the first input performed by the user on a first sub-control in the target control, the first sub-control indicates the first application; and
   the responding to the first input and displaying a user interface of the second application in the first region comprises:
   responding to the first input and displaying the user interface of the second application indicated by a second sub-control in the first region, wherein
   the second sub-control is determined by the first input,
   wherein the responding to the first input and displaying the user interface of the second application indicated by a second sub-control in the first region comprises:
   responding to the first input, and adjusting the first sub-control from a first acreage to a second acreage;
   obtaining the second sub-control whose control acreage is the second acreage; and
   displaying the user interface of the second application indicated by the second sub-control in the first region,
   or
   wherein the responding to the first input and displaying the user interface of the second application indicated by a second sub-control in the first region comprises:
   responding to the first input, displaying an alternate control having a same initial control acreage with the first sub-control, and adjusting an acreage of the alternate control to the second acreage;
   obtaining the second sub-control whose control acreage is the second acreage; and
   displaying the user interface of the second application indicated by the second sub-control in the first region.

2. The interface display method according to claim 1, wherein the at least two sub-controls are in an overlapping state.

3. The interface display method according to claim 1, wherein after the displaying the user interface of the second application indicated by the second sub-control in the first region, the method further comprises:
   adjusting the second sub-control from the second acreage to the first acreage.

4. The interface display method according to claim 1, wherein the terminal comprises the first region and a second region;
   before receiving the first input performed by the user on the target control, the user interface of the first application is displayed on the first region, and the user interface of the second application is displayed on the second region; and
   after the displaying the user interface of the second application in the first region, the method further comprises:
   displaying the user interface of the first application in the second region.

5. The interface display method according to claim 1, wherein the terminal comprises at least two regions; and
   before the receiving the first input performed by the user on the target control, the method further comprises:
   receiving a third input performed by the user;
   obtaining a quantity N of regions in which the user interface of the application is displayed; and
   responding to the third input, displaying the target control, the target control comprising N sub-controls, and each sub-control indicating an application displayed on one region, wherein
   N is an integer greater than 1.

6. A terminal, comprising: a memory, a processor, and a program stored in the memory and executable on the processor, wherein the program is executed by the processor to implement:
   receiving a first input performed by a user on a target control in a case of displaying a user interface of a first application in a first region of a screen of the terminal, and the target control being used to indicate the first application and/or a second application; and
   responding to the first input and displaying a user interface of the second application in the first region,
   wherein the target control comprises: at least two sub-controls, and each sub-control indicates one application, each sub-control indicates a different application,
   wherein the program is executed by the processor to implement:
   receiving the first input performed by the user on a first sub-control in the target control, the first sub-control indicates the first application; and wherein the program is executed by the processor to implement:

responding to the first input and display the user interface of the second application indicated by a second sub-control in the first region, where the second sub-control is determined by the first input, wherein the program is executed by the processor to implement:

responding to the first input, and adjust the first sub-control from a first acreage to a second acreage;

obtaining the second sub-control whose control acreage is the second acreage; and displaying the user interface of the second application indicated by the second sub-control in the first region, or wherein the program is executed by the processor to implement:

responding to the first input, display an alternate control having a same initial control acreage with the first sub-control, and adjust an acreage of the alternate control to the second acreage;

obtaining the second sub-control whose control acreage is the second acreage; and displaying the user interface of the second application indicated by the second sub-control in the first region.

7. The terminal according to claim 6, wherein the at least two sub-controls are in an overlapping state.

8. A computer readable storage medium, storing a computer program, wherein the computer program is executed by a processor to implement:

receiving a first input performed by a user on a target control in a case of displaying a user interface of a first application in a first region of a screen of the terminal, and the target control being used to indicate the first application and/or a second application; and responding to the first input and displaying a user interface of the second application in the first region, wherein the target control comprises: at least two sub-controls, and each sub-control indicates one application, each sub-control indicates a different application, wherein the computer program is executed by the processor to implement:

receiving the first input performed by the user on a first sub-control in the target control, the first sub-control indicates the first application; and wherein the computer program is executed by the processor to implement:

responding to the first input and display the user interface of the second application indicated by a second sub-control in the first region, where the second sub-control is determined by the first input, wherein the computer program is executed by the processor to implement:

responding to the first input, and adjust the first sub-control from a first acreage to a second acreage;

obtaining the second sub-control whose control acreage is the second acreage; and displaying the user interface of the second application indicated by the second sub-control in the first region, or wherein the computer program is executed by the processor to implement:

responding to the first input, display an alternate control having a same initial control acreage with the first sub-control, and adjust an acreage of the alternate control to the second acreage;

obtaining the second sub-control whose control acreage is the second acreage; and displaying the user interface of the second application indicated by the second sub-control in the first region.

* * * * *